United States Patent
Blanchard et al.

(10) Patent No.: US 8,035,656 B2
(45) Date of Patent: Oct. 11, 2011

(54) TV SCREEN TEXT CAPTURE

(75) Inventors: Robert Blanchard, Escondido, CA (US); Peter Rae Shintani, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 521 days.

(21) Appl. No.: 12/313,124

(22) Filed: Nov. 17, 2008

(65) Prior Publication Data

US 2010/0123735 A1 May 20, 2010

(51) Int. Cl.
G09G 5/00 (2006.01)

(52) U.S. Cl. .......................... 345/619; 345/629

(58) Field of Classification Search .................. 345/619, 345/629, 635
See application file for complete search history.

(56) References Cited

U.S. PATENT DOCUMENTS

| | | | |
|---|---|---|---|
| 5,041,992 A * | 8/1991 | Cunningham et al. ........ 345/641 |
| 5,262,860 A | 11/1993 | Fitzpatrick et al. |
| 6,100,941 A | 8/2000 | Dimitrova et al. |
| 6,101,274 A | 8/2000 | Pizano et al. |
| 6,204,842 B1 * | 3/2001 | Fujii ............................ 715/717 |
| 6,219,453 B1 | 4/2001 | Goldberg |
| 6,249,283 B1 | 6/2001 | Ur |
| 6,400,996 B1 | 6/2002 | Hoffberg et al. |
| 6,587,586 B1 | 7/2003 | Cui et al. |
| 6,614,930 B1 | 9/2003 | Agnihotri et al. |
| 6,658,662 B1 | 12/2003 | Nielsen |
| 7,088,873 B2 | 8/2006 | Anisimovich et al. |
| 7,139,033 B2 | 11/2006 | Sun |
| 7,190,370 B1 * | 3/2007 | Haeberli et al. ............... 345/582 |
| 7,210,093 B1 * | 4/2007 | Dutta ............................ 715/210 |
| 7,590,998 B2 * | 9/2009 | Hanley ......................... 725/112 |
| 2002/0083464 A1 | 6/2002 | Tomsen et al. |
| 2003/0106065 A1 * | 6/2003 | Sakai et al. ..................... 725/91 |
| 2004/0015517 A1 | 1/2004 | Park et al. |
| 2004/0117405 A1 | 6/2004 | Short et al. |
| 2004/0177063 A1 | 9/2004 | Weber et al. |
| 2004/0190854 A1 | 9/2004 | Dunn et al. |
| 2004/0214541 A1 * | 10/2004 | Choi ......................... 455/186.1 |

(Continued)

FOREIGN PATENT DOCUMENTS

EP 0 720 114 A2 11/1995

(Continued)

OTHER PUBLICATIONS

"Detection of Text Captions in Compressed Domain Video," Yi Zhang and Tat-Seng Chua, School of Computing, National University of Singapore, pp. 201-204, Date unknown.

(Continued)

*Primary Examiner* — Ryan R Yang

(74) *Attorney, Agent, or Firm* — Miller Patent Services; Jerry A. Miller

(57) ABSTRACT

A method of processing television images consistent with certain implementations involves receiving a command from a television user interface to capture a television image; capturing and storing a frame of the television image to a frame memory device; receiving commands from the television user interface for editing the captured image to at least isolate a portion of the image; editing the captured image in accord with the editing commands; and storing the isolated portion of the image to a storage device for subsequent retrieval. This abstract is not to be considered limiting, since other embodiments may deviate from the features described in this abstract.

27 Claims, 8 Drawing Sheets

U.S. PATENT DOCUMENTS

| | | |
|---|---|---|
| 2004/0228613 A1* | 11/2004 | Lin et al. ............ 386/52 |
| 2005/0246747 A1 | 11/2005 | Braun et al. |
| 2006/0008260 A1 | 1/2006 | Chen et al. |
| 2006/0047704 A1 | 3/2006 | Gopalakrishnan |
| 2006/0053470 A1 | 3/2006 | Colter et al. |
| 2006/0090189 A1 | 4/2006 | Gruber |
| 2006/0117374 A1 | 6/2006 | Kortum et al. |
| 2006/0179453 A1 | 8/2006 | Kadie et al. |
| 2006/0242259 A1 | 10/2006 | Vallabh et al. |
| 2006/0271594 A1 | 11/2006 | Haberman |
| 2007/0005653 A1 | 1/2007 | Marsh |
| 2007/0028282 A1 | 2/2007 | Kooijmans et al. |
| 2007/0028284 A1 | 2/2007 | Lee |
| 2007/0214488 A1 | 9/2007 | Nguyen et al. |
| 2008/0074548 A1 | 3/2008 | Nagata et al. |
| 2008/0091713 A1 | 4/2008 | Candelore et al. |
| 2008/0097984 A1 | 4/2008 | Candelore |
| 2008/0122978 A1* | 5/2008 | Yen et al. ............ 348/559 |
| 2008/0196075 A1 | 8/2008 | Candelore |
| 2008/0199150 A1 | 8/2008 | Candelore |

FOREIGN PATENT DOCUMENTS

| | | |
|---|---|---|
| EP | 1 074 926 A2 | 8/2000 |
| JP | 2006-191413 | 7/2006 |
| JP | 2007-259020 | 10/2007 |
| WO | WO 01/28240 A1 | 4/2001 |
| WO | WO 01/37465 | 5/2001 |
| WO | WO 01/72040 A2 | 9/2001 |
| WO | WO 03/051031 A2 | 6/2003 |

OTHER PUBLICATIONS

English Translation, Abstract Only, Patent Abstracts of Japan, Publication No. 2005056228 A, Mar. 3, 2005.

International Search Report and Written Opinion, PCT/US2009/063228, dated May 20, 2010. (Received Jun. 10, 2010).

* cited by examiner

TV SCREEN TEXT CAPTURE

CROSS REFERENCE TO RELATED DOCUMENTS

This application is related to U.S. patent application Ser. No. 11/706,919 filed Feb. 14, 2007, Ser. No. 11/706,890 filed Feb. 14, 2007, Ser. No. 11/715,856 filed Mar. 8, 2007 and Ser. No. 11/706,529 filed Feb. 14, 2007, all to Candelore, which are hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Often a within a television program or commercial advertisement, a message, product name, phone number, URL etc. that has importance or relevance to the viewer may be shown. The user might be able to remember or to write down the information for future reference. But, often the user forgets, can't find a pen or may lose the note. Assuming the user was able to record the information, often the next step is to go to a computer in order to utilize the recorded/memorized information.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
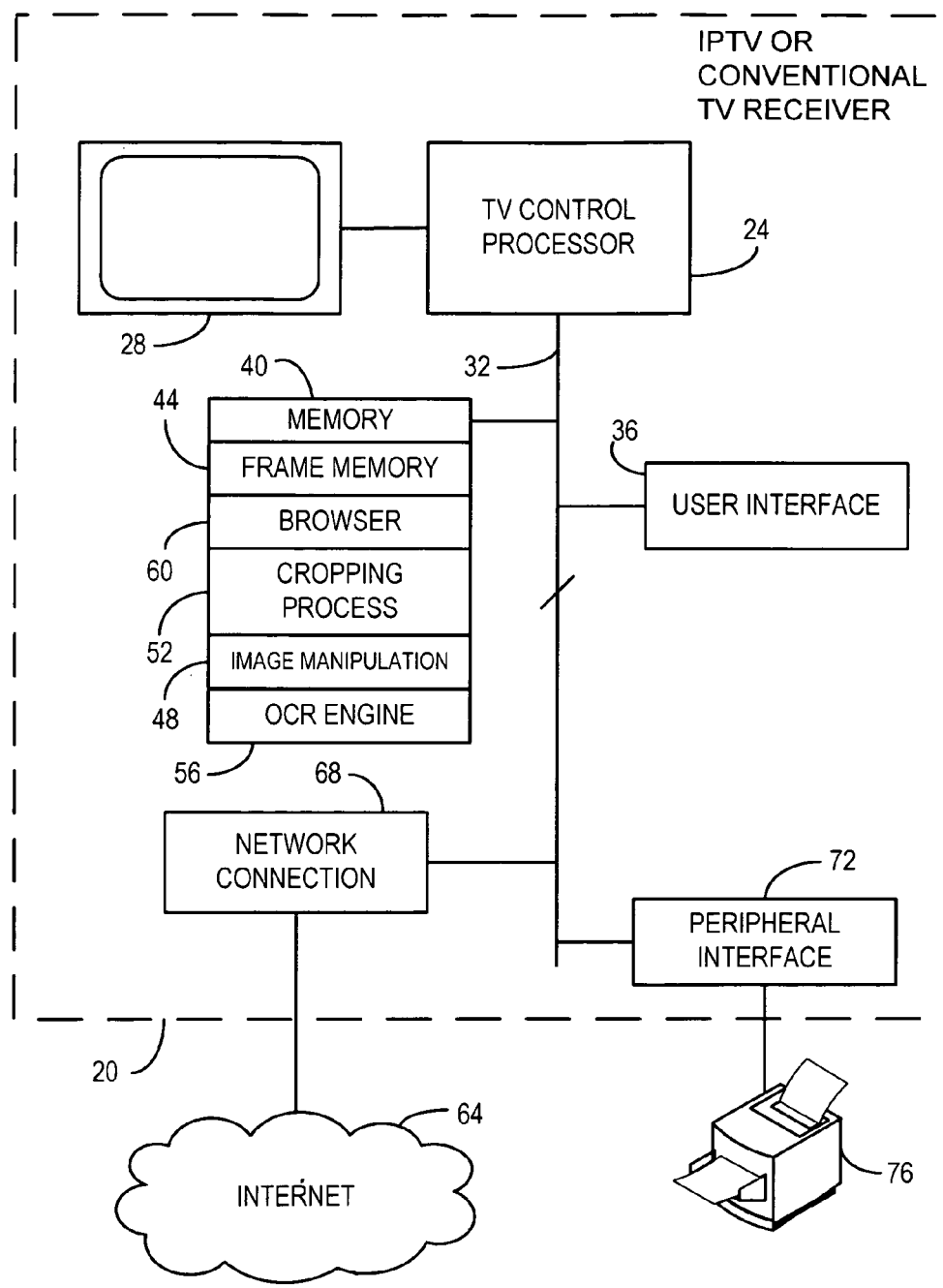
FIG. 1 is a block diagram of an example implementation of a television system consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The tern "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "processor", "controller", "CPU", "Computer" and the like as used herein encompasses both hard programmed, special purpose, general purpose and programmable devices and may encompass a plurality of such devices or a single device in either a distributed or centralized configuration without limitation.

As noted above, often a within a television program or commercial advertisement, a message, product name, phone number, URL, URI or other text that has importance or relevance to the viewer (i.e., the viewer wishes to use or remember the information) may be shown. The user might be able remember or to write down the information for future reference. But, often the user forgets, can't find a pen or may lose the note. Assuming the user was able to record the information, often the next step is to go to a computer in order to utilize the recorded/memorized information. However, if the television (TV) is enabled to perform a selective screen capture at the user's discretion, then the saved screen alleviates the user of having to remember or record the broadcast message.

In the above-referenced patent applications, screen captures and Optical Character Recognition (OCR) have been used to access metadata associated with a television program for various purposes. In such cases, however, analysis is done on entire screens in order to capture the metadata. In accord with certain implementation of the present invention, the captured image can be manually controlled, and manually analyzed if desired. In other aspects, there may be no necessity for the more complex parsing operations needed for extraction of the metadata and in some instances, OCR functionality in the TV may be unnecessary. In some implementations, the user can select the scene to be captured. Then, the user may leisurely recall the captured image for review whenever desired or may pass the captured portion of the image to an OCR engine that can more readily process the simplified image.

The TV may have an integrated browser or may be a simple display for another device's browser. The TV can scale and store the captured image. Hence the user can view both the captured image and an edited portion of the captured image, i.e., cropped, rotated, zoomed and/or otherwise manipulated using image manipulation features. In some implementations, this can be done at the same time as a browser is displayed on the screen A TV can leverage either a split screen or picture-in-picture feature to display the program image and also a simple browser. The captured image of the program image can thereby be displayed in the split screen or picture-in-picture window with the browser overlaying the image in a translucent fashion. The user can then either manually extract the information from the captured image (i.e., use the captured image as a memo pad of sorts) to be input into the browser.

In other implementations, an OCR engine (which may be of relative simplicity since the image to be recognized can be optimized manually by isolation using human intervention using image manipulation) can be used to convert selected portions of the image to characters for input to the browser. In one example, the user uses a cursor function to highlight a portion of the displayed captured image, and this information is processed in an OCR process in the OCR engine and the derived data is then inserted into the browser's search entry.

The display saves the image selected by the user. In one implementation, to save memory size, there can be an option that allows the user to save a specific quadrant or other segment of the screen area. Conversely when displaying the captured image, the user can be enabled to manipulate the image such as by cropping rotating, zooming, inverting, and/or selectively displaying only a quadrant or sector of the saved image. This allows the viewer to view a large portion of the captured image that was of interest.

To consider an illustrative example, consider FIG. 1 wherein a television receiver 20 such as a conventional analog or digital television receiver or an Internet protocol television (IPTV) is provided with a TV control processor 24 that controls attributes of the television display 28 in a conventional manner as well as controlling operation of aspects of operation consistent with embodiments of the present invention. Processor 24 is connected to a number of other elements via one or more communication buses 32 (depicted as a single bus). A user interface 36 may include a control panel and/or remote controller interfaces (e.g., infrared receivers and the like) to facilitate user interaction with programming stored in memory 40 or other storage provided within or accessible to the processor 24. For purposes of this document, memory 40 includes any semiconductor or other storage elements used in connection with processor 24.

Memory 40 includes a frame memory 44 that is used to store selected frames of images or portions thereof by the user for later retrieval or for other purposes as described herein. The image can be manipulated using image manipulation routines 48 such as a cropping process 52 that allows the user to select only a portion of the image for storage and analysis. The memory 40 may also store programs for carrying out OCR processing in the form of an OCR engine 56 and a browser program 60 that can carry out browsing operations including use of search engines on the Internet 64 via a network connection 68 that permits the processor 24 to operate as a web browser using user interface 36 for user input and display 28 for visual user output.

One or more peripheral interfaces 72 may be provided also such as a universal serial bus or an IEEE 1394 bus so that communication with either external storage or a printing device 76 or the like can be supported.

Figure 2:
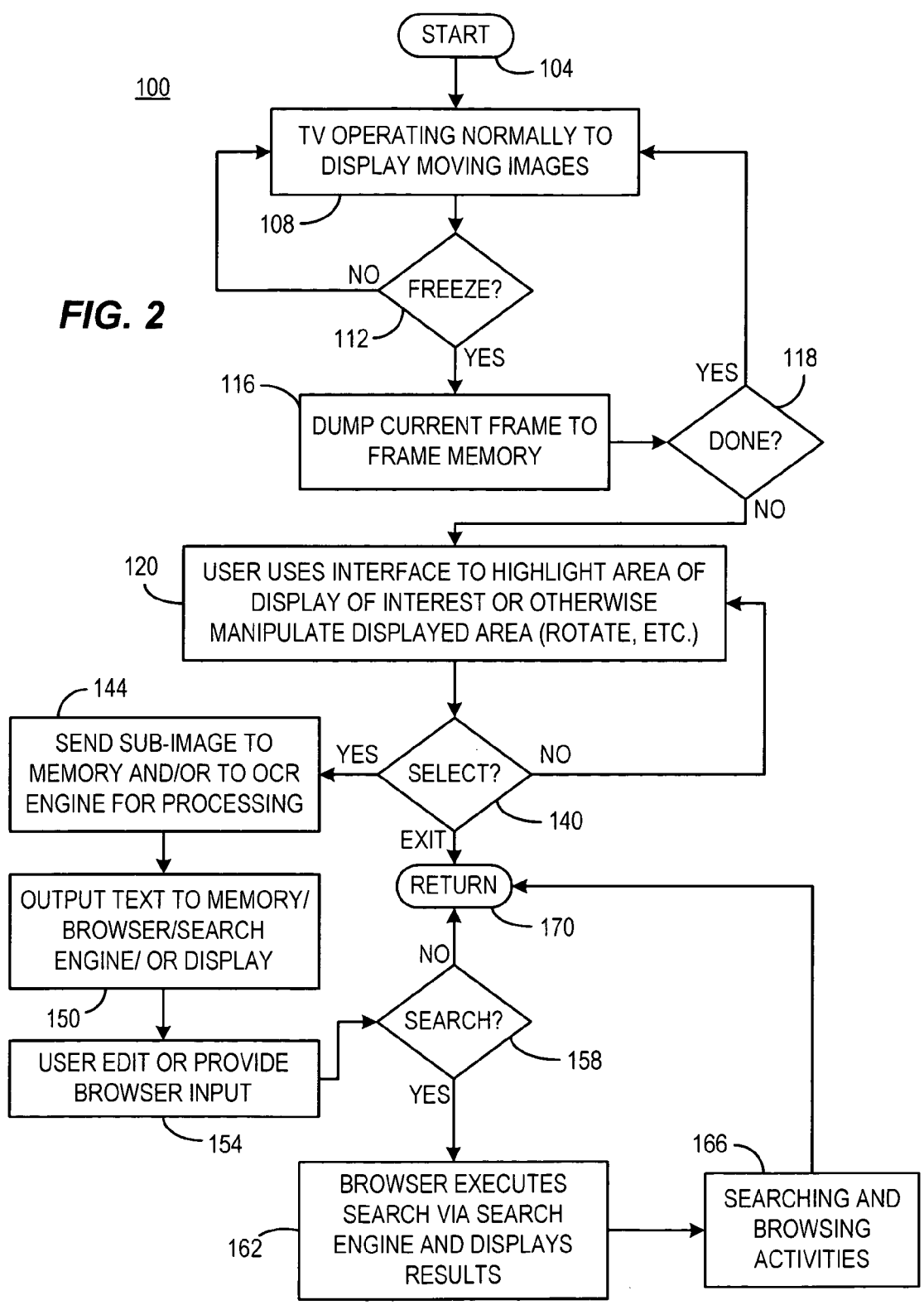
FIG. 2 is a flow chart of an example process consistent with certain embodiments of the present invention.

With reference to FIG. 2, an example implementation of one process 100 is depicted starting at 104. In this example, when the TV is operating normally at 108, the user may execute a "freeze" command at 112 via a remote controller or other suitable interface. Until such command is invoked, the TV continues to operate normally at 108. When the "freeze" command is invoked at 112, the contents of the current video image frame being displayed is dumped or transferred to a frame memory at 116 so that it can be retrieved in its entirety or so that it can be manipulated as will be described. If the user is done for now at 118, normal television operation can continue at 108. If the user wishes to continue operating on the frozen image at 118, control passes to 120. The user interface can then be utilized by the user at 120 to manipulate the image in any of a variety of ways including zooming to an area that is selected by a cursor, rotating the image, inverting the image, manipulation of color or removal of color, or cropping.

Figure 3:
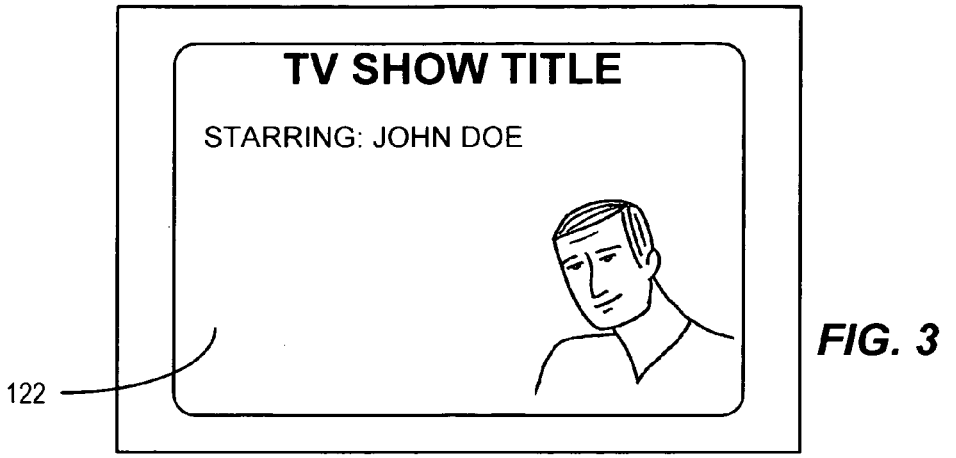
FIG. 3 is an example simulated screen shot consistent with certain embodiments of the present invention.
Figure 4:
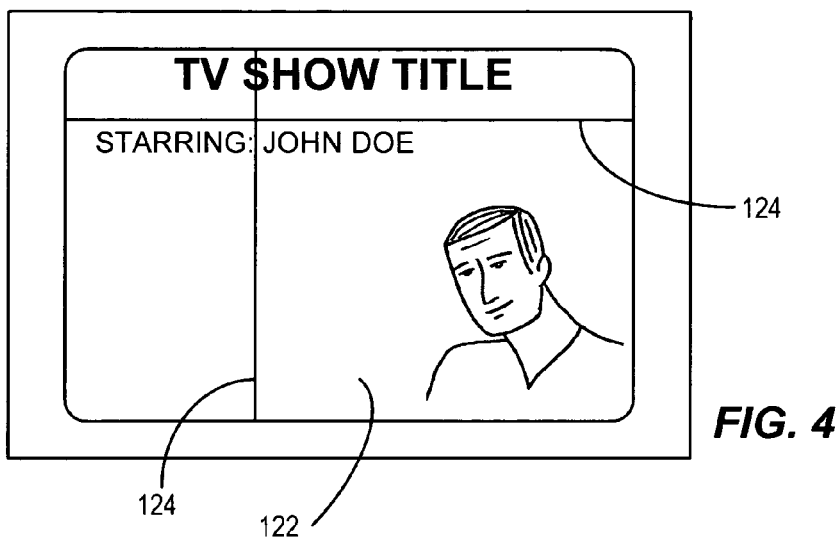
FIG. 4 is an example simulated screen shot consistent with certain embodiments of the present invention.
Figure 5:
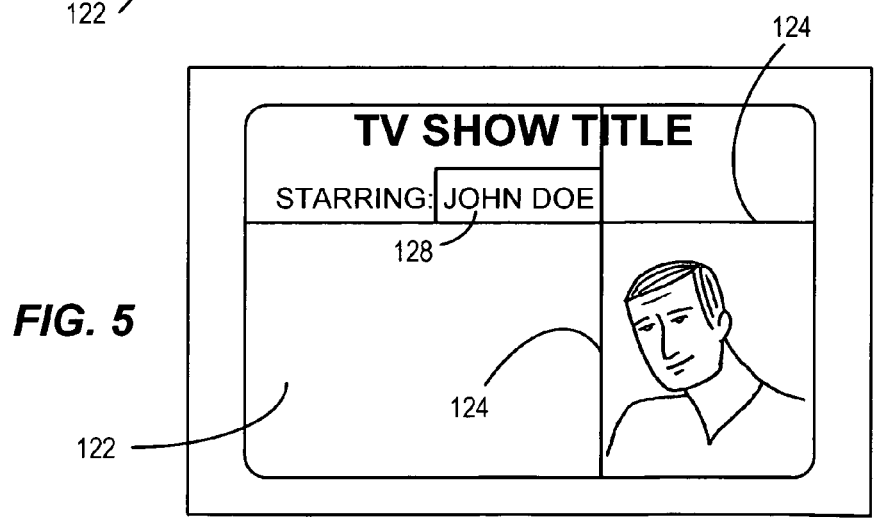
FIG. 5 is an example simulated screen shot consistent with certain embodiments of the present invention.
Figure 6:
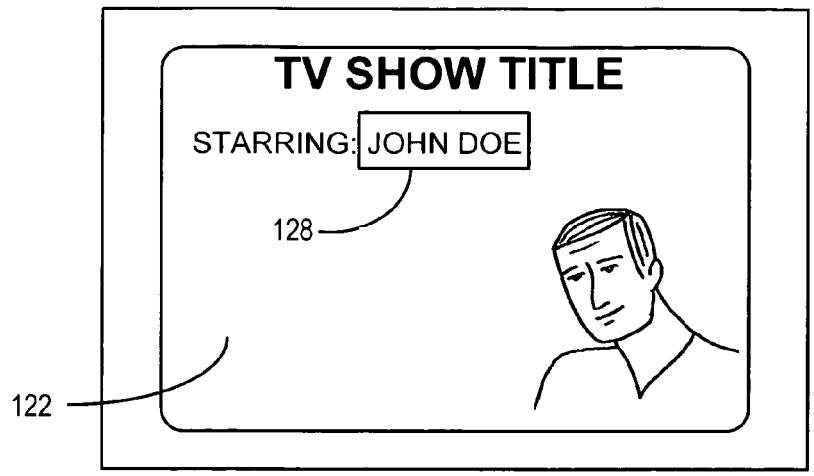
FIG. 6 is an example simulated screen shot consistent with certain embodiments of the present invention.

By way of example and not limitation, one technique for manipulation of the image by cropping is depicted in a series of simulated screen shots shown as FIGS. 3-6. FIG. 3 shows the image frame 122 as selected using the "freeze" command. This image shows text information that is of interest to the viewer—in particular the star's name "John Doe". In order to capture this portion of the image (sub-image), a user can manipulate a set of intersecting cropping lines 124 or other indicators (e.g., crosses or the like) to first locate an upper left corner of the text (in this example) as shown in FIG. 4. Once located as desired, the user "selects" the location of their intersection to identify one corner of the desired sub-image. The process can then be repeated as shown in FIG. 5 by moving the intersecting cropping lines 124 to a lower right corner to define a box 128 containing the sub-image of interest as further depicted in FIG. 6.

Figure 7:
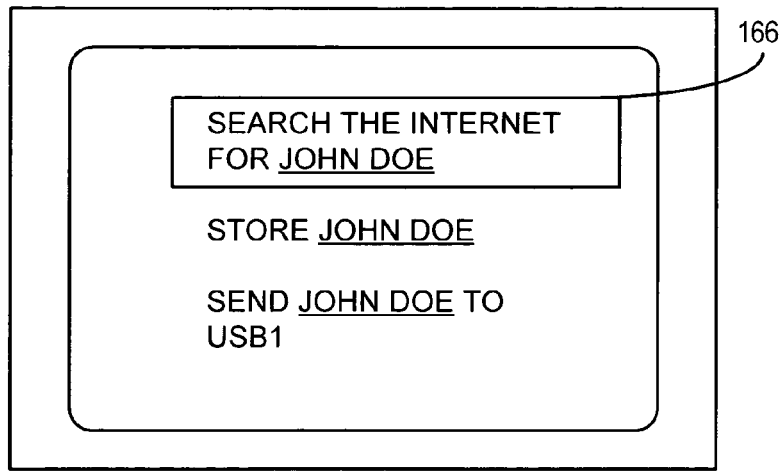
FIG. 7 is an example simulated screen shot of a menu consistent with certain embodiments of the present invention.
Figure 8:
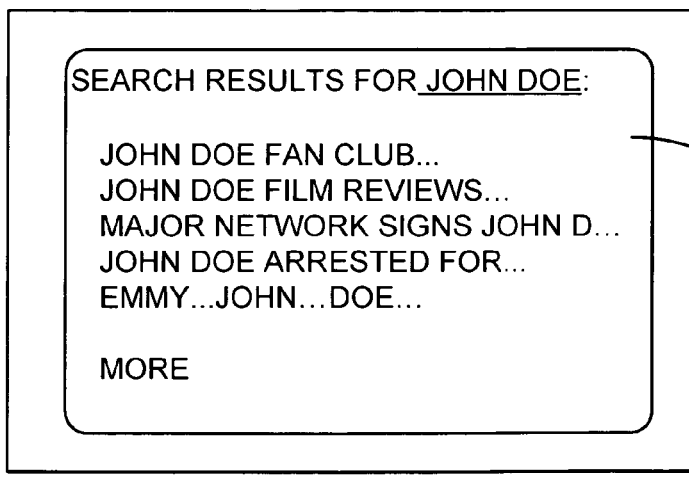
FIG. 8 is an example simulated screen shot of search results consistent with certain embodiments of the present invention.

Referring back to FIG. 2, once a sub-image has been created as shown or using other manipulation techniques, the sub-image is considered selected at 140 and is sent to memory (e.g., to another portion of frame memory 44 or other storage depicted generally as 40 at 144. The sub-image can then be separately recalled as desired or can be sent to an OCR engine for processing at 144. When sent to the OCR engine for processing at 144, the OCR engine will output text that can be stored to memory, directly inserted into a search engine via the browser or can be simply displayed at 150. Recognized text can be edited or supplemented at 154 and/or passed to the search engine via browser 60. If a search is to be carried out at 158, the browser executes the search via a search engine and displays the result at 162. In one implementation, the user can be provided with a menu as depicted in FIG. 7 where the user can elect to search the Internet 64 as depicted by selection of this option as 166, or may carry out other menu options such as storage or sending the information to a particular address or port (e.g., a USB port, a networked peripheral, a network connected device, etc.). Search results are depicted in one example in FIG. 8 for illustrative purposes and not by way of limitation.

Again returning to FIG. 2, once the initial search is completed, the user can proceed with conventional browsing activities using browser function 64 to find information on the Internet 64 at 166 until done at 170 as will be indicated by a user command or menu selection, at which point normal television operation can resume at 108.

Figure 9:
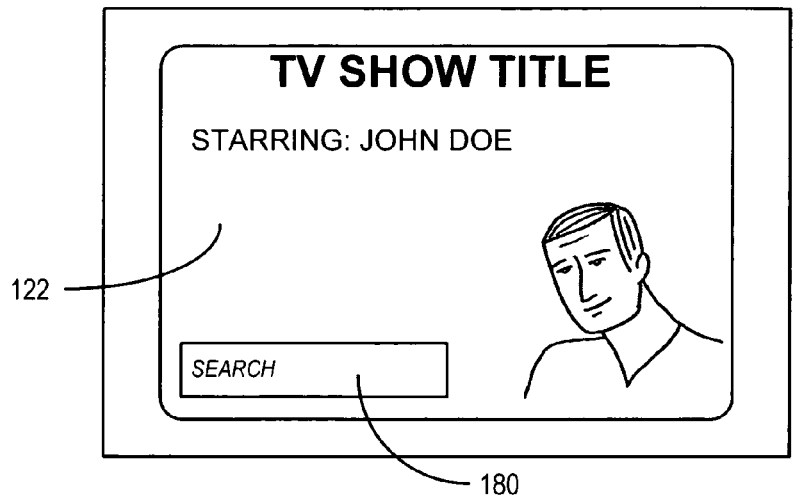
FIG. 9 is an example simulated screen shot incorporating a search box consistent with certain embodiments of the present invention.
Figure 10:
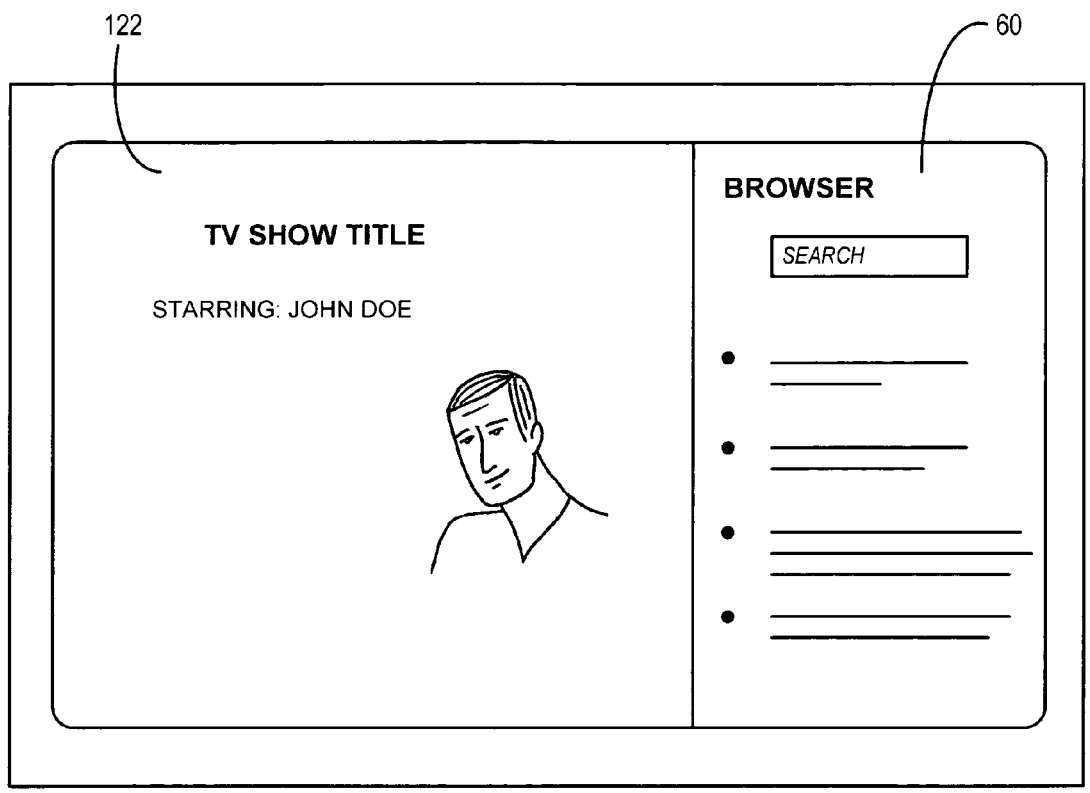
FIG. 10 is an example simulated screen shot incorporating a browser area and an image area consistent with certain embodiments of the present invention.

FIGS. 9-10 depict other implementations wherein the frozen frame 122 can be used for reference value with a search box 180 appearing in the image as in FIG. 9 or outside (of a reduced size version of the image as shown as 180 in FIG. 10). In this implementation, the frozen image can be used by the user as a memo pad that has captured reference information that can then be manually entered into a search box on screen. Thus, in certain embodiments, the captured screen can be configured to insert a text entry box for keying in the information the user desires to transfer to the browser in the example shown or alternatively to storage at a storage device. This allows a seamless interface directly tied to the browser or other devices. The captured screen can be later shared with other devices such as a PC, PDA, etc. through any interface (including networked devices).

The fact that currently available TV sets have a 16:9 aspect ratio, and that computer displays often have nearly a 4:3 aspect ratio, allows for convenient multi-screen combinations. Within the 16:9 active area of the display, a 4:3 image representing the original frozen frame 122 can be shown at the full height of the 16:9 screen and remaining area can be used to display the computer screen image of the browser 60. If desired, when the user is trying to enter information into the browser, the view of the captured image can be shown as a large image, and screen of the browser can be reversed. The sizes can be reversed again if desired.

Figure 11:
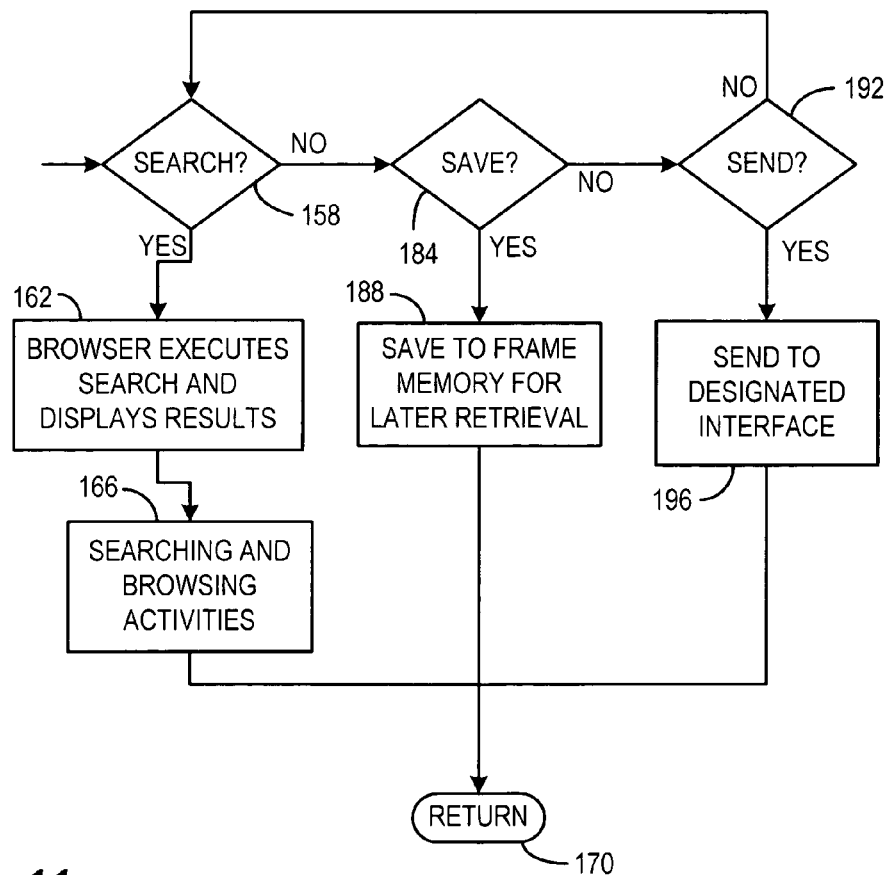
FIG. 11 is a flow chart of an example process consistent with certain embodiments of the present invention.

Once the image has been captured as described, whether edited or not, FIG. 2 depicts a searching option using an OCR engine, but other options can be readily made available using a decision chain in the programming as depicted by way of example in FIG. 11. In this example, in addition to a search decision at 158, a save operation can be selected at 184 in which the image is saved at 188 to the frame memory or other storage location for later retrieval. Similarly, a send command can be implemented at 192 wherein the image is sent to a designated target such as printer 76 at 196 or any other available target, address or interface.

As previously noted, a TV receiver's can split screen or picture-in-picture feature can be leveraged to simultaneously display the program image along with a simple browser. The captured image of the program image can thereby be displayed in the split screen or picture-in-picture window with the browser overlaying the image in a translucent fashion. The user can then either manually extract the information from the captured image (i.e., use the captured image as a memo pad of sorts) to be input into the browser. One example of this process is depicted in the simulated screen shots of FIGS. 12-17.

Figure 12:
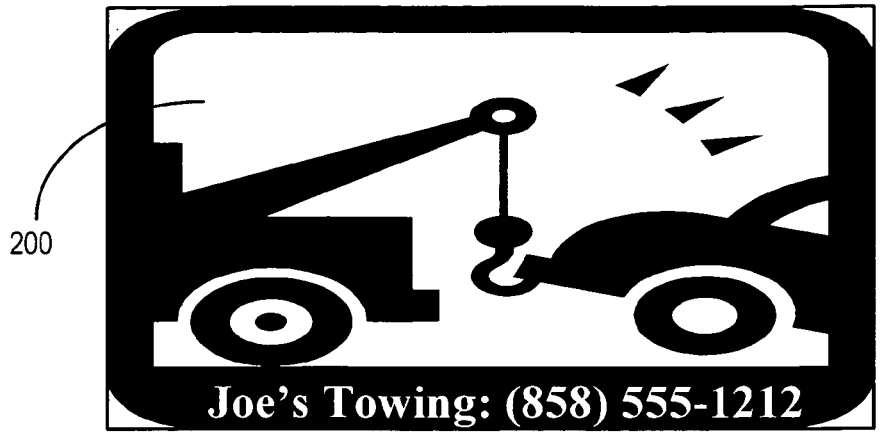
FIG. 12 is an example simulated screen shot depicting a full screen captured image consistent with certain embodiments of the present invention.
Figure 13:
FIG. 13 is an example simulated screen shot depicting a split screen full height captured image consistent with certain embodiments of the present invention.
Figure 14:
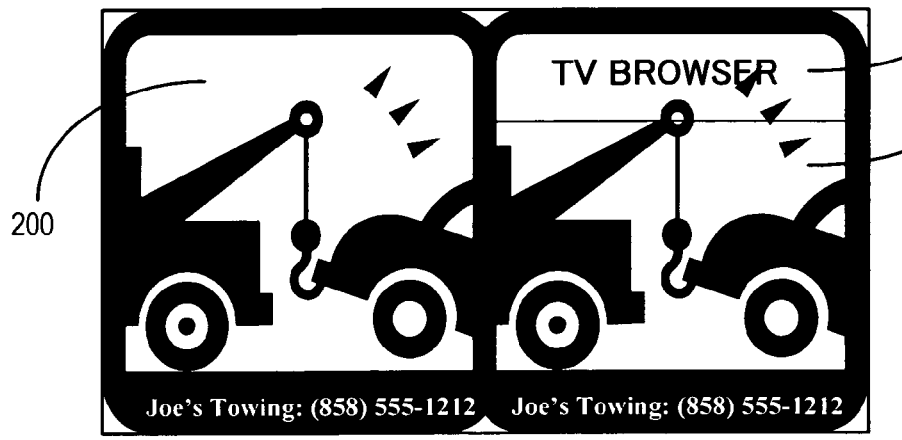
FIG. 14 is an example simulated screen shot depicting a split screen full height captured image with a depiction of a TV browser overlay consistent with certain embodiments of the present invention.

FIG. 12 is an example simulated screen shot depicting a full screen captured image consistent with certain embodiments of the present invention. In this example, the full 16:9 image frame is used to carry the image 200 in a normal viewing arrangement. In the example of FIG. 13 a split screen full height captured image 200 is displayed in both sides of the split screen in a manner consistent with certain embodiments of the present invention. FIG. 14 shows an example simulated screen shot depicting a split screen full height captured image 200 on both sides with a depiction of a TV browser overlay 204 consistent with certain embodiments of the present invention. While these depictions are in black and white line, colors can be used to accent the overlay if desired.

Figure 15:
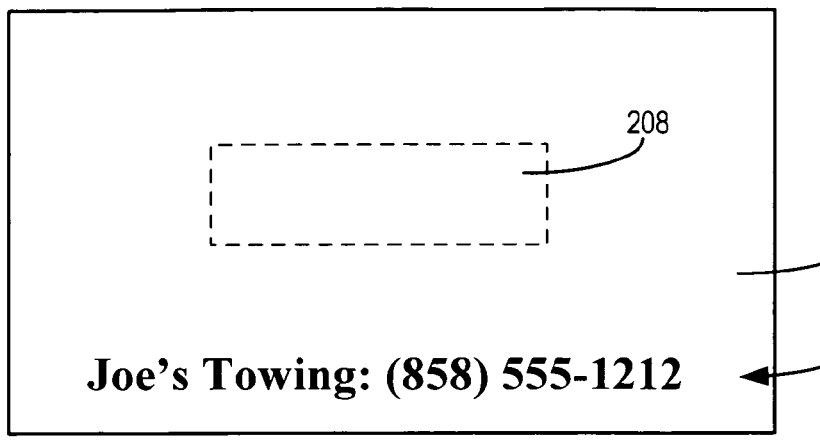
FIG. 15 is an example simulated screen shot simplified by removal of most of the image depicting a selection box used to capture screen information in a manner consistent with certain embodiments of the present invention.
Figure 16:
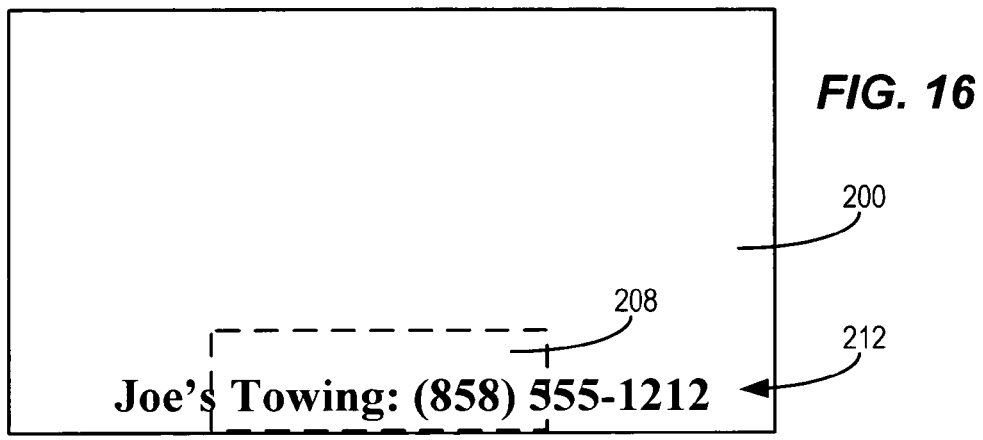
FIG. 16 is an example simulated screen shot simplified by removal of most of the image depicting a selection box moved downward to capture screen information in a manner consistent with certain embodiments of the present invention.

FIG. 15 is an example simulated screen shot simplified by removal of most of the image 200 so as to simplify the depiction of the action being described. A selection box 208 in the form of a capture rectangle is used to capture screen information such as that depicted generally as 212 in a manner consistent with certain embodiments of the present invention. Through a remote controller or other user interface, the capture rectangle 208 is first brought into displayed over the image. Again colors may be useful to accent the capture rectangle 208. In FIG. 16 the capture rectangle 208 is moved downward to capture screen information in a manner consistent with certain embodiments of the present invention. This is again accomplished through use of a remote controller or other user interface. The remote controller's up/down curser for example can be used to move the rectangle down to the area of interest. In this case, the user wishes to focus on the caption "Joe's Towing (858) 555-1212)", depicted generally as 212.

Figure 17:
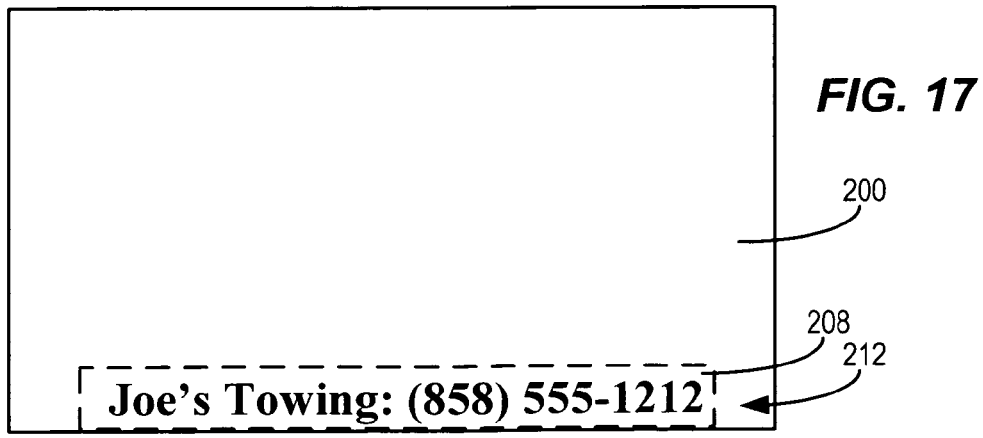
FIG. 17 is an example simulated screen shot simplified by removal of most of the image depicting a selection box expanded outward to the left and right used to capture screen information in a manner consistent with certain embodiments of the present invention.

FIG. 17 is an example simulated screen shot simplified by removal of most of the image depicting a selection box expanded outward to the left and right and otherwise adjusted in size to capture only the screen information desired in a manner consistent with certain embodiments of the present invention. The remote controller's horizontal and vertical keys can thus be used to adjust the rectangle over the area of interest and the image is captured.

Hence, embodiments consistent with this invention provide a system and method for manually capturing and storing images of selected television (TV) frames to facility entry into a TV-based browser. With this invention, the viewer can edit the captured image using edit function such as cropping, rotating and/or scaling the captured image at the same time as the browser is being displayed on the screen. The information can be later extracted by the viewer either manually or allowing a portion of the captured image to undergo OCR process by highlighting it with a cursor and the derived data is then inserted into the browser's search entry. Moreover, the captured image can be shared with other devices by sending the stored isolated portion of the image to at least one of a personal computer, a personal digital assistant, a storage device or a telephone, etc. by employing network devices, etc. Furthermore, the higher aspect ratio of the TV screens (16:9 aspect ratio) would allow the viewer to have multiple display on a single screen, for e.g. displaying the image in one part and the browser in the other portion of the screen. The system permits capturing and storing images of selected television screen in certain implementations and editing the captured image by, for example, rotating, cropping and scaling of the captured image at the same time as the browser is being displayed on the screen in certain implementations. A portion of the captured image can undergo OCR processing and the derived data can be inserted into the browser's search entry. The captured and/or edited image can be shared with other devices such as a personal computer (PC), personal digital assistant (PDA), storage device, telephone, etc.

A method of processing television images involves receiving a command from a television user interface to capture a television image; capturing and storing a frame of the television image to a frame memory device; receiving commands from the television user interface for editing the captured image to at least isolate a portion of the image; editing the captured image in accord with the editing commands; and storing the isolated portion of the image to a storage device for subsequent retrieval.

In certain implementations, the storage device can be a portion of the frame memory device. In certain implementations, the editing commands include at least one of rotating, cropping and scaling of the captured image. In certain implementations, the editing is carried out while a browser is being displayed on the screen. In certain implementations, the browser is displayed as an overlay in either a picture-in-picture or a split screen display. In certain implementations, the browser is displayed as an overlay in one of side of a split screen display that displays a full height rendition of an original image scaled to the split screen. In certain implementations, the original image is scaled for a 16:9 active display area and the full height rendition is scaled to a full height image in the split screen to represent the original frozen frame. In certain implementations, the method further involves OCR processing the edited and captured image to derive character data therefrom, and inserting the character data into a search engine via a browser. In certain implementations, the capturing is carried out in accord with commands received from a remote controller to manipulate a capture rectangle or cropping lines. In certain implementations, the method further involves sending the stored isolated portion of the image to at least one of a personal computer, a personal digital assistant, a storage device or a telephone.

Another method of processing television images involves receiving a command from a television user interface to capture a television image; capturing and storing a frame of the television image to a frame memory device; receiving commands from the television user interface for editing the captured image to at least isolate a portion of the image; editing the captured image in accord with the editing commands, wherein the editing is carried out while a browser is being displayed on the screen as an overlay; and storing the isolated portion of the image to a portion of the frame memory device for subsequent retrieval.

In certain implementations, the editing commands include at least one of rotating, cropping and scaling of the captured image. In certain implementations, the browser is displayed as an overlay in either a picture-in-picture or a split screen display. In certain implementations, the browser is displayed as an overlay in one of side of a split screen display that displays a full height rendition of an original image scaled to the split screen, and wherein the original image is scaled for a 16:9 active display area and the full height rendition is scaled to a full height image in the split screen to represent the original frozen frame. In certain implementations, the method further involves OCR processing the edited and captured image to derive character data therefrom, and inserting the character data into a search engine via a browser. In certain implementations, the capturing is carried out in accord with commands received from a remote controller to manipulate a capture rectangle or cropping lines. In certain implementations, the method further involves sending the stored isolated portion of the image to at least one of a personal computer, a personal digital assistant, a storage device or a telephone.

Another method of processing television images involves receiving a command from a television user interface to capture a television image; capturing and storing a frame of the television image to a frame memory device; in accord with commands received from a remote controller to manipulate a capture rectangle or cropping lines, isolating a portion of the stored frame of the television image; editing the isolated portion of the image in accord with the editing commands, wherein the editing is carried out while a browser is being displayed on the screen as an overlay, and wherein the editing commands include at least one of rotating, cropping and scaling of the captured image; wherein the browser is displayed as an overlay in one of side of a split screen display that displays a full height rendition of an original image scaled to the split screen, and wherein the original image is scaled for a 16:9 active display area and the full height rendition is scaled to a full height image in the split screen to represent the original frozen frame; storing the isolated portion of the image to a portion of the frame memory device for subsequent retrieval; OCR processing the edited and captured image to derive character data therefrom, and inserting the character data into a search engine via a browser; and sending the stored isolated portion of the image to at least one of a personal computer, a personal digital assistant, a storage device or a telephone.

A computer readable storage medium can be used to store instructions which, when executed on one or more programmed processors, carry out any of the methods described above.

Those skilled in the art will recognize, upon consideration of the above teachings, that certain of the above exemplary embodiments are based upon use of one or more programmed processors. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using one or more programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry that carries out the functions described, other embodiments are contemplated in which the circuit functions are carried out using equivalent executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A method of processing television images, comprising:
receiving a command from a television user interface to capture a television image;
as a result of receipt of the command, capturing and storing a single frame of the television image to a frame memory device of the television;
receiving commands from the television user interface for editing the captured image to at least isolate a portion of the image;
editing the captured image in accord with the editing commands; and
storing the isolated portion of the image to a storage device for subsequent retrieval.

2. The method according to claim 1, wherein the storage device comprises a portion of the frame memory device.

3. The method according to claim 1, wherein the editing commands include at least one of rotating, cropping and scaling of the captured image.

4. The method according to claim 3, wherein the editing is carried out while a browser is being displayed on the screen.

5. The method according to claim 4, wherein the browser is displayed as an overlay in either a picture-in-picture or a split screen display.

6. The method according to claim 4, wherein the browser is displayed as an overlay in one of side of a split screen display that displays a full height rendition of an original image scaled to the split screen.

7. The method according to claim 1, further comprising OCR processing the edited and captured image to derive character data therefrom, and inserting the character data into a search engine via a browser.

8. The method according to claim 1, wherein the capturing is carried out in accord with commands received from a remote controller to manipulate a capture rectangle or cropping lines.

9. The method according to claim 1, further comprising sending the stored isolated portion of the image to at least one of a personal computer, a personal digital assistant, a storage device or a telephone.

10. A computer readable storage medium storing instructions which, when executed on one or more programmed processors, carry out a method according to claim 1.

11. A method of processing television images, comprising:
receiving a command from a television user interface to capture a television image;
as a result of receipt of the command, capturing and storing a single frame of the television image to a frame memory device of the television;
receiving commands from the television user interface for editing the captured image to at least isolate a portion of the image;
editing the captured image in accord with the editing commands, wherein the editing is carried out while a browser is being displayed on the screen as an overlay; and
storing the isolated portion of the image to a portion of the frame memory device for subsequent retrieval.

12. The method according to claim 11, wherein the editing commands include at least one of rotating, cropping and scaling of the captured image.

13. The method according to claim 11, wherein the browser is displayed as an overlay in either a picture-in-picture or a split screen display.

14. The method according to claim 11, further comprising OCR processing the edited and captured image to derive character data therefrom, and inserting the character data into a search engine via a browser.

15. The method according to claim 14, wherein the capturing is carried out in accord with commands received from a remote controller to manipulate a capture rectangle or cropping lines.

16. The method according to claim 11, further comprising sending the stored isolated portion of the image to at least one of a personal computer, a personal digital assistant, a storage device or a telephone.

17. The method according to claim 11, further comprising sending the stored isolated portion of the image to at least one of a personal computer, a personal digital assistant, a storage device or a telephone.

18. A method of processing television images, comprising:
receiving a command from a television user interface to capture a television image;
capturing and storing a frame of the television image to a frame memory device;
in accord with commands received from a remote controller to manipulate a capture rectangle or cropping lines, isolating a portion of the stored frame of the television image;
editing the isolated portion of the image in accord with the editing commands, wherein the editing is carried out while a browser is being displayed on the screen as an overlay, and wherein the editing commands include at least one of rotating, cropping and scaling of the captured image;
wherein the browser is displayed as an overlay in one of side of a split screen display that displays a full height rendition of an original image scaled to the split screen, and wherein the original image is scaled for a 16:9 active display area and the full height rendition is scaled to a full height image in the split screen to represent the original frozen frame;

storing the isolated portion of the image to a portion of the frame memory device for subsequent retrieval;

OCR processing the edited and captured image to derive character data therefrom, and inserting the character data into a search engine via a browser; and sending the stored isolated portion of the image to at least one of a personal computer, a personal digital assistant, a storage device or a telephone.

19. A method of processing television images, comprising:
receiving a command from a television user interface to capture a television image;
capturing and storing a frame of the television image to a frame memory device;
receiving commands from the television user interface for editing the captured image to at least isolate a portion of the image;
editing the captured image in accord with the editing commands;
storing the isolated portion of the image to a storage device for subsequent retrieval;
where the editing commands include at least one of rotating, cropping and scaling of the captured image, and where the editing is carried out while a browser is being displayed on the screen; and
where the browser is displayed as an overlay in one of side of a split screen display that displays a full height rendition of an original image scaled to the split screen, and where the original image is scaled for a 16:9 active display area and the full height rendition is scaled to a full height image in the split screen to represent the original frozen frame.

20. The method according to claim 19, where the storage device comprises a portion of the frame memory device.

21. The method according to claim 19, further comprising OCR processing the edited and captured image to derive character data therefrom, and inserting the character data into a search engine via a browser.

22. The method according to claim 19, where the capturing is carried out in accord with commands received from a remote controller to manipulate a capture rectangle or cropping lines.

23. The method according to claim 19, further comprising sending the stored isolated portion of the image to at least one of a personal computer, a personal digital assistant, a storage device or a telephone.

24. A method of processing television images, comprising:
receiving a command from a television user interface to capture a television image;
capturing and storing a frame of the television image to a frame memory device;
receiving commands from the television user interface for editing the captured image to at least isolate a portion of the image;
editing the captured image in accord with the editing commands, wherein the editing is carried out while a browser is being displayed on the screen as an overlay;
storing the isolated portion of the image to a portion of the frame memory device for subsequent retrieval; and
where the browser is displayed as an overlay in one of side of a split screen display that displays a full height rendition of an original image scaled to the split screen, and where the original image is scaled for a 16:9 active display area and the full height rendition is scaled to a full height image in the split screen to represent the original frozen frame.

25. The method according to claim 24, where the editing commands include at least one of rotating, cropping and scaling of the captured image.

26. The method according to claim 24, further comprising OCR processing the edited and captured image to derive character data therefrom, and inserting the character data into a search engine via a browser.

27. The method according to claim 24, where the capturing is carried out in accord with commands received from a remote controller to manipulate a capture rectangle or cropping lines.

* * * * *